Dec. 18, 1962    E. NASSOUR    3,068,615
MEANS FOR PRODUCING ANIMATED PHOTOGRAPHS
Filed Aug. 17, 1959    2 Sheets-Sheet 1
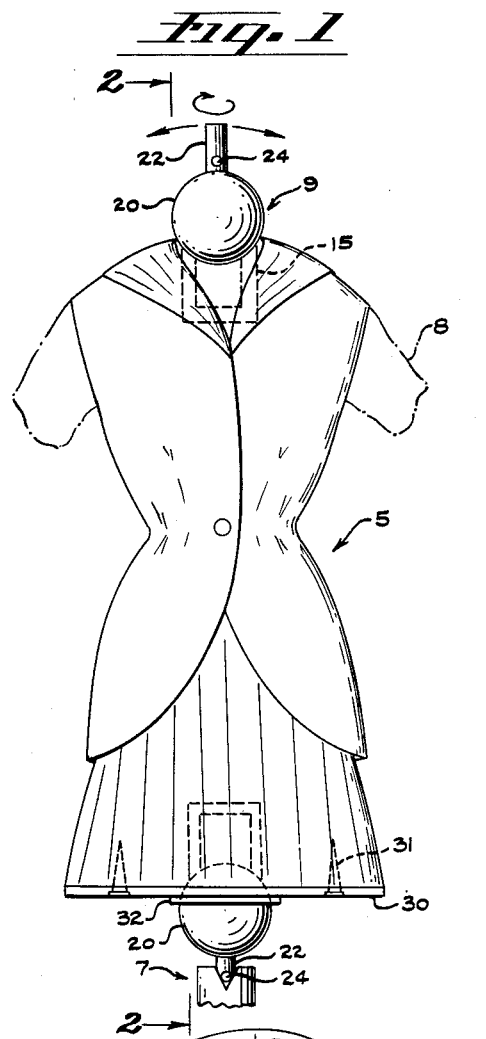
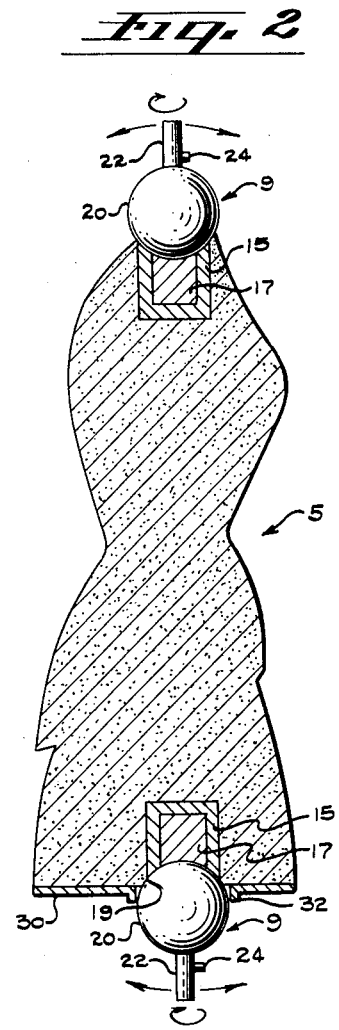
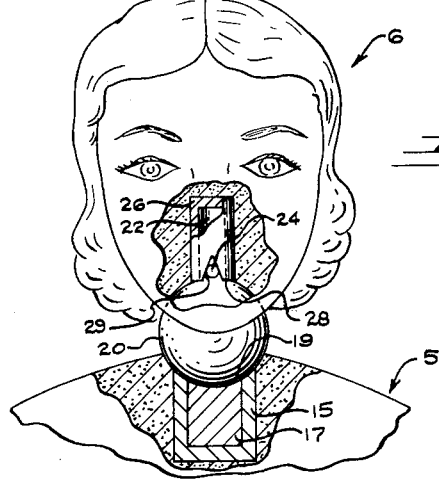
EDWARD NASSOUR
INVENTOR
BY
ATTORNEYS Dec. 18, 1962  E. NASSOUR  3,068,615
MEANS FOR PRODUCING ANIMATED PHOTOGRAPHS
Filed Aug. 17, 1959  2 Sheets-Sheet 2
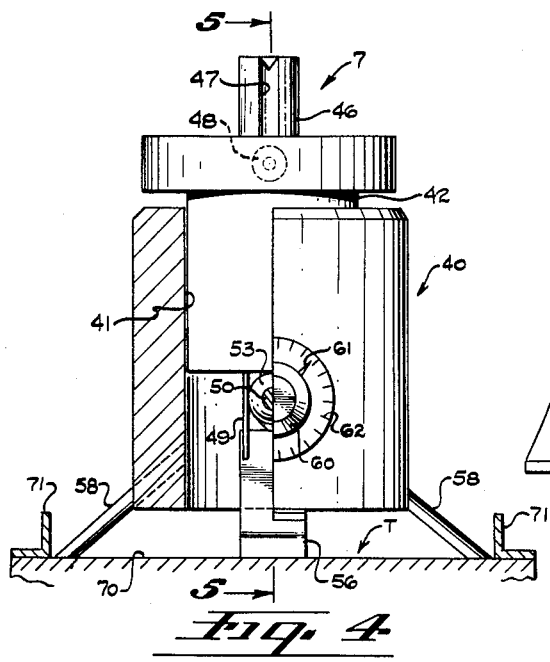
Fig. 4
Fig. 5
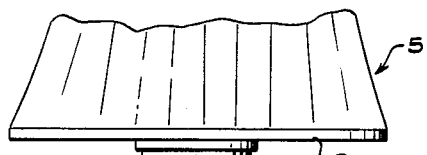
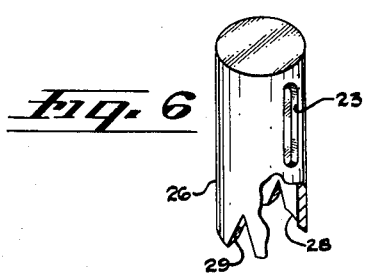
Fig. 6
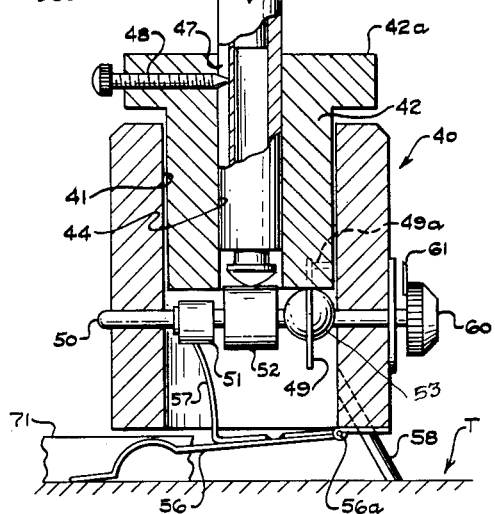
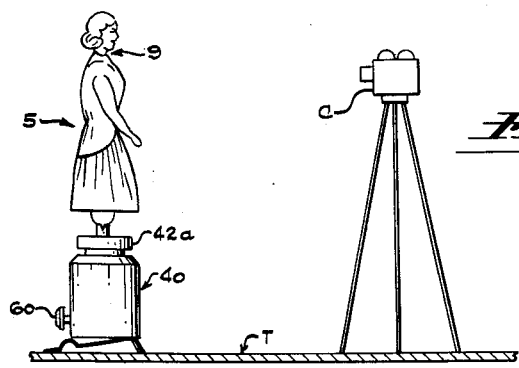
Fig. 7
EDWARD NASSOUR
INVENTOR
BY *Mason & Graham*
ATTORNEYS

# United States Patent Office 3,068,615
Patented Dec. 18, 1962

3,068,615
MEANS FOR PRODUCING ANIMATED
PHOTOGRAPHS
Edward Nassour, 8460 W. 3rd St., Los Angeles, Calif.
Filed Aug. 17, 1959, Ser. No. 834,106
8 Claims. (Cl. 46—241)

My invention has to do with the art of producing animated photographs, and relates more particularly to the producing of such pictures by the sequential arranging and photographing of figures in different positions of animation.

In making animated motion pictures by the use of inanimate figures, one frame of the motion picture is photographed of the figure in one position, and like successive frames are then photographed showing other like figures in different positions of animation. For instance in producing a motion picture of a figure walking, it usually requires a dozen or more shots for each complete step cycle, each picture showing the different positions assumed by the head, body, arms and legs in each stage of the animation. In accordance with conventional practice, this requires a separate figure for each photographic shot, each figure having its parts in different positions of animation.

While my present invention is particularly useful in the making of close-up shots, it is also useful in the making of distance shots.

It is an object of my invention to provide novel means for supporting a single figure to different positions for animation as well as for permitting such portions of the figure as the head and arms to be moved from one position to another and held in the adjusted position during the taking of the next photographic shot.

In its more particular aspects, my invention has an object the provision of novel joint means for movably supporting the body of a figure as well as for movably supporting the heads and limbs of the figure in different positions of animation.

A further object of my invention is the provision of a novel method of animated photography which may be carried out with the use of a single figure.

Still further objects and advantages will appear hereinafter.

While I shall point out in the appended claims the features which I believe to be new, I shall now, for the purpose of enabling those skilled in the art to understand and practice my invention, describe the best means for and mode of carrying my invention into practice which I have thus far devised, for which purpose I shall refer to the accompanying drawings wherein:

FIG. 1 is a front elevational view showing the body portion of a figure;

FIG. 2 is a section taken on line 2—2 of FIG. 1;

FIG. 3 is a front elevational view of the head portion of the figure, with parts shown in section;

FIG. 4 is a view partly in side elevation and partly in longitudinal section, showing the base and track upon which my figure is supported;

FIG. 5 is a section taken on line 5—5 of FIG. 4;

FIG. 6 is a perspective view, with part broken away, showing the bushing which forms a part of the joint member; and FIG. 7 is a schematic view.

In the accompanying drawings I show, and will now describe, an embodiment of my invention which is particularly useful in the making of closeup photographic shots.

Referring now to the drawing (FIGS. 1-3), the numeral 5 generally denotes the body portion of a figure of which closeup animated photographic shots are to be made; 6 (FIG. 3) denotes the head to be photographed in various positions on the body; 7 denotes a base upon which the body is adjustably supported; numeral 8 denotes the arms of the figure; and the numeral 9 generally denotes the respective joint members, by which the various appendages, such as the head and arms, are adjustably attached to the body, and by which the body is attached to the base.

Each of the joint members 9 includes a cup 15 in which a magnet 17 is mounted. The outer end portions of the cup and magnet are dished to provide a spherical socket 19 for rotatably receiving a metallic ball 20 capable of being attracted by the magnet.

The ball has affixed thereto a pin 22 which projects radially therefrom for insertion into the portion of the figure to be joined to the body by the joint member, said pin having a radial projection 24.

While I have shown the cup and magnet as being mounted in the body 5 of the figure, it will be understood that they may be mounted, instead, in the member to be joined to the body if desired. Normally, the body, head and arms are molded of plastic, and, molded into the member to be joined to the body, I provide a tubular bushing 26 which detachably receives the pin 22. As shown in FIG. 6, the exterior side surface portion of the bushing has a recess 23 formed therein so that, in molding the bushing in the member to be attached to the body, some of the plastic will fill the recess and prevent axial escape of the bushing from the member. The outer end of the bushing may be beveled to present an end surface 28 substantially conforming to the contour of the ball 20, and presents a V-shaped slot 29 in its outer end, to receive the projection 24 to insure proper positioning of the member on the body.

While I have described only one of the joint members 9, it will be understood that the joint members are alike except that those (not shown) which connect the arms to the body are of relatively small dimensions.

A bottom plate 30 may be secured on the bottom end of the body of the figure, as by screws 31, and has a flanged opening 32 to pass the contiguous portion of the ball 20 of the joint member which connects the body to the base 7.

It will be apparent that not only may the body be tilted to, for instance, depict the sway occurring during walking, but also the arms and head may be moved relative to the body into various positions depicting its different positions of animation to be successively photographed, rendering it possible to utilize a single figure for a complete sequence of photographs. The construction of the joint members and the attraction of the magnets is such that while the ball may be rotated in the socket 19, the ball is firmly held in any position of adjustment. Also it is possible to swing the head or other member in excess of 180° relative to the body.

For supporting the figure during the making of the successive photographs, I provide the base 7 and the track construction shown in FIGURES 4 and 5, which will now be described.

The base 7 comprises a base portion 40 having an axial bore 41 in which a core 42 is reciprocally mounted. The core has a somewhat loose fit in the bore 41 so that it may also be tilted relative to its longitudinal axis as well as moved axially relative to the base portion 40. The core has an axial bore 44 to reciprocally receive an adjustment member 46 which latter is longitudinally slotted at 47. To prevent the adjustment member 46 from rotating relative to the core while permitting it to move axially relative thereto, I thread a screw 48 radially through the flanged top end portion 42a of the core, the pointed inner end of the screw engaging in the slot 47.

To prevent the core 42 from rotating relative to the base portion 40, I provide a pair of depending pins 49 whose inner ends are secured in corresponding holes in the core by set screws 49a, and whose outer end portions straddle the shaft 50, which shaft is rotatably journaled at its ends in aligned openings in base portion 40.

On the shaft 50, within the base portion, I provide longitudinally spaced eccentric enlargements or cams 51, 52, 53. Eccentric enlargement 52 engages the bottom end portion of the adjustment member 46; while the eccentric enlargement 53 laterally engages the bottom end of the core, so that during a complete revolution of the shaft the core is tilted and the adjustment member 46 is moved axially. The cams are so disposed that they sequentially engage the part or parts which they are to move.

For providing a tilting movement of the entire base in response to rotation of the shaft 50, I pivotally attach one end of an arm 56 to the base portion 40 at 56a and dispose its free end to engage the tract T upon which the base is supported. A second arm 57 is connected to the arm 56 and extends angularly therefrom to engage the eccentric enlargement or cam 51. The base 7 is also supported from the track T by two legs 58 each spaced 90° from the arm 56.

The track T has a horizontal surface 70 on which the legs 58 and arm 56 rest, and along which surface the said legs and arm may be slid between the guide members 71.

For manually rotating the shaft 50 I secure a knob 60 on its outer end. The knob carries a radial pointer 61 which, by registering with calibrations 62 on the base portion 40, visually indicates the extent of the rotation of the shaft. The open top end of the adjustment member 46 receives the pin 22 of the bottom joint member 9 and has a V slot 29a in its top end to receive the projection 24 to prevent rotation of the figure relative to the base.

In use, the base, with its supported figure, is placed on the track T between the guides 71. The head, arms and body are moved about their respective joints to place them in the desired position to be occupied by them at the start of the animation and a photograph is taken of the figure in that position. Then, for each successive shot, the base is moved the desired distance along the track and the head, arms and body are moved about their joints to the desired position. This procedure continues until the complete cycle of shots are completed. For instance, in FIG. 7, I show the figure slideably mounted on the track T and show the camera C positioned to photograph the successive positions of the figure.

While, for the specific adaptation for close-up shots of the figure, I have shown the base 7, it will be understood that, for distance shots, legs may be attached to the body by the joint members.

I claim:

1. In a device for making an animated motion picture, an inanimate figure to be photographed, a base, said base comprising a bottom portion having a cylindrical axial bore, a tubular core member tiltably and axially moveably mounted in said bore, an adjustment member axially slideably mounted in said core member, a shaft rotatably journaled in said bottom portion and disposed transversely thereof beneath said core member and said adjustment member, said shaft carrying longitudinally spaced cams operatively cooperating with said core and adjustment members to sequentially impart axial and tilting movements to said core and axial movement to said adjustment member in response to rotation of said shaft; and means adjustably securing said base to said figure.

2. The device of claim 1 wherein said last named means includes ball and socket members, one of which is magnetized to attract the other.

3. The device of claim 1 which additionally includes means operative in response to rotation of said shaft to impart tilting movement to said bottom portion of said base.

4. In a device for use in making an animated motion picture, an inanimate figure having a body portion and a head portion, a joint member pivotally connecting said head portion to said body portion, a base, a joint member pivotally connecting said body portion to said base, a track member, an arm, pivot means securing the inner end of said arm to the bottom of said base at a point laterally offset from the longitudinal axis of said base, said arm extending diametrically of and beneath said base and diagonally downwardly therefrom into engagement with said track member, a shaft rotatably journaled in and extending transversely of said base, a cam carried by said shaft, said arm having a lateral projection between its ends engaging said cam, and a pair of base supporting legs depending from the bottom of said base and engaging said track member, each of said legs being spaced substantially 90° from said arm.

5. In an adjustably supported device for use in making animated motion pictures including an inanimate figure and a base for supporting same in desired positions to be successively photographed, and a joint means connecting said figure to said base for relative movements therebetween; the improvement comprising a rotatable support in said base in which said joint means is axially adjustable, and a mounting means pivotally connected in said base for tiltably adjusting the axis of said rotatable support, whereby said figure may be tilted and rotated on the axis of said rotatable support in any adjusted position of said joint means.

6. The device of claim 5 in which the joint means connecting said figure to said base includes magnetically attracted ball and socket means.

7. The device of claim 6 in which said inanimate figure includes a body portion and a head portion, and a magnetically attracted ball and socket member connecting said body and head portions for relative adjustments thereof.

8. The device of claim 7, in which a figure adjusting member is mounted in said base and has a dial adjacent one end thereof, and said member having means operative thereby to effect both tilting and axial adjustment of said inanimate figure.

References Cited in the file of this patent

UNITED STATES PATENTS

| | | |
|---|---|---|
| 526,667 | Schultz | Sept. 25, 1894 |
| 2,241,929 | Kendig | May 13, 1941 |
| 2,367,171 | Kroll | Jan. 9, 1945 |
| 2,623,329 | Di Leva | Dec. 30, 1952 |
| 2,691,845 | Jepson | Oct. 19, 1954 |
| 2,759,528 | Rachman et al. | Dec. 9, 1954 |
| 2,919,516 | Schaefer | Jan. 5, 1960 |